3,329,724
MANUFACTURE OF METHACROLEIN
Charles W. Hargis, Howard S. Young, and James E. Williams, Kingsport, Tenn., assignors to Eastman Kodak Company, Rochester, N.Y., a corporation of New Jersey
No Drawing. Filed Nov. 6, 1961, Ser. No. 150,187
5 Claims. (Cl. 260—601)

This invention relates to oxidation of isobutyraldehyde to methacrolein. More particularly, the invention relates to selective oxidation of isobutyraldehyde to methacrolein by oxidizing action of oxides of molybdenum and oxides of uranium. An object of the invention is to provide a method for selective oxidation of isobutyraldehyde to methacrolein. Another object is to provide such a process for producing good yields of methacrolein by selective oxidation of isobutyraldehyde using an oxide of molybdenum or uranium as an oxidant.

We have discovered that when isobutyraldehyde is contacted with oxides of molybdenum or oxides of uranium under suitable conditions, a very good yield of methacrolein is obtained. The reaction appears to involve a direct and selective oxidation of the saturated aldehyde to the corresponding unsaturated aldehyde and a corresponding reduction of an equimolar portion of the metal oxide. Evidence of this reaction includes the formation of water, an ethylenically unsaturated compound, and a metal oxide of lower valence state.

According to the invention, isobutyraldehyde is reacted with an oxide of a metal selected from the group consisting of molybdenum and uranium at a temperature in the range from 225° C. to 500° C. This may be accomplished by contacting vapors of isobutyraldehyde with the selected oxide for a contact time in the range from 1 to 50 seconds at the selected temperature. Conveniently, the isobutyraldehyde vapors may be passed through a reaction zone packed with a bed of the selected metal oxide which has been preheated to the selected reaction temperature.

"Contact time" as the term is used in this specification, is defined as the time in seconds that one volume of gaseous feed is in contact with an equal volume of the oxidant at reaction conditions. Depending on other variable conditions, the preferred contact time will usually be within the range from 2 to 12 seconds. If desired, the gaseous feed stream may include an inert diluent, such as nitrogen, to facilitate removal of products from the reaction zone.

As the reaction proceeds, the activity of the metal oxide in the reaction zone will decrease since available oxygen is consumed during the reaction. The spent metal oxide can be regenerated by reoxidation from time to time. This can be accomplished quite simply by discontinuing the isobutyraldehyde feed and passing air through the bed of spent oxidant for a period of time sufficient to reoxidize the reduced metal oxide to a higher valence state. The oxidation can be carried out at the same temperature used for the synthesis of methacrolein or at some other suitable temperature. The reoxidation step is highly exothermic and must be controlled within the desired temperature range by suitable means of heat removal, such as a stream of nitrogen or other inert gas, fed through the oxidant with air.

The process of the invention may be carried out in equipment suitable for the purpose, such as a fixed-bed or a moving-bed reactor. An advantage of the moving-bed reactor is that spent oxidant may be continuously removed and fresh oxidant supplied to the reaction zone so that the process can be carried out continuously.

Following are specific examples illustrating the invention:

*Example I*

Quantities of 0.416 mole of isobutyraldehyde and 0.416 mole of nitrogen are fed over a period of 1 hours into a reactor containing 164.3 grams of granular $MoO_3$ at a temperature of 301° C. and a contact time of 10 seconds. The reaction product is collected in traps cooled to 10° C. and —80° C. The condensate is composed of an aqueous phase and an organic phase. The organic phase amounts to 91.6 percent of the weight of isobutyraldehyde fed. Analysis of the product shows 0.0938 mole of methacrolein, 0.0127 mole biacetyl and 0.260 mole of unreacted isobutyraldehyde. The conversion of isobutyraldehyde to methacrolein is 22.6 percent. The yield of methacrolein based on isobutyraldehyde consumed is 60.2 percent. The spent oxide is then regenerated by passing air through the reactor in contact with the hot spent oxide until no further heat of reaction is observed.

*Example II*

The experiment of Example I is repeated using the regenerated oxide from Example I. A quantity of 0.418 mole of isobutyraldehyde and an equal amount of nitrogen are fed into the reactor over a period of 1 hour. The products are collected as before. The conversion of isobutyraldehyde to methacrolein is 23.8 percent and the yield is 61.6 percent. Some biacetyl is also produced.

*Example III*

Quantities of 0.1723 mole of isobutyraldehyde and 0.1723 mole of nitrogen are fed over a period of 0.5 hour to a reactor containing 86.1 grams of granular uranium trioxide at a temperature of 300° C. Organic products are collected as before. Analysis of the product indicates 17.9 percent of the isobutyraldehyde feed is converted to methacrolein and the yield based upon isobutyraldehyde consumed is 48.8 percent. Some biacetyl is also observed. After this use the oxide is black in color. The spent oxide is regenerated by passing air through the reactor until no further heat of reaction is observed. The dark coloration persists after reoxidation with air.

*Example IV*

The regenerated uranium oxide of Example III is again reacted with isobutyraldehyde in a similar manner at a temperature of 350° C. The reactor is operated for a total time of 1.5 hours; however, the actual operation is carried out in three 30-minute intervals and the oxide is regenerated with air as before, after each interval. A total of 0.476 mole of isobutyraldehyde is fed to the reactor, together with the same amount of nitrogen. The product is collected as before. Analysis indicates that 21 percent of the isobutyraldehyde fed is converted to methacrolein and the yield based on isobutyraldehyde consumed is 60.6 percent. The product also contains a small amount of biacetyl.

The process of the invention may be operated over a wide range of temperature, and wide ranges of pressure and contact time. However, because of the sensitive nature of organic compounds to temperature under oxidative conditions, consideration must be given to changes in other operating variables, such as contact time, as the temperature is varied within the preferred temperature range. For example, with increasing temperature, the contact time must be decreased to avoid excessive consumption of feed stock and side reactions. While we have not fully investigated the effect of pressure on the process, it is expected that the process can be operated at sub-atmospheric pressure as well as at atmospheric pressure.

The regenerated oxide obtained in Example I has a different color from the starting $MoO_3$. This may indicate that the regenerated oxide is a lower oxide, that is, the oxide of Mo in a lower valence state. Exact identification of the final active species has not been determined but we expect that a starting material of a lower oxide of molybdenum or uranium would also be suitable since the regenerated oxide, apparently a lower oxide, is shown to be active by Example II.

In a cyclic process the time of exposure of the solid oxidizing agent to the reducing atmosphere of the organic feed is of significant importance. Relatively short periods of exposure will require correspondingly shorter periods of regeneration, and further, the regeneration will be easier to control since the amount of heat produced during regeneration will be less. Higher overall conversion of the feed is obtained with shorter periods of exposure between regeneration periods since the activity of the oxidant is decreased during longer periods of exposure as the available oxygen is consumed.

It is expected that oxides of molybdenum and uranium will be effective as selective oxidants for removing hydrogen atoms from alpha-beta carbon atoms in saturated acids, ketones, nitriles, to produce the corresponding alpha-beta unsaturated organic acids, ketones and nitriles.

While the invention has been described with reference to particular preferred embodiments, it will be understood that variations and modifications can be effected within the spirit and scope of the invention, as described above and as defined in the following claims.

We claim:

1. A process which comprises reacting isobutyraldehyde with an oxide of a metal selected from the group consisting of molybdenum and uranium by contacting vapor of isobutyraldehyde with the metal oxide at a temperature in the range from 225° to 500° C. for a contact time in the range from 1 to 50 seconds and obtaining methacrolein and water.

2. A process according to claim 1 in which the reaction is carried out by contacting vapor of isobutyraldehyde with the metal oxide at a temperature in the range from 275° to 375° C. for a contact time in the range from 1 to 50 seconds.

3. A process according to claim 2 in which the reaction is carried out by contacting vapor of isobutyraldehyde with the metal oxide at a temperature in the range from 275° to 375° C. for a contact time in the range from 2 to 12 seconds.

4. A cyclic process for preparing methacrolein comprising alternately passing vapor of isobutyraldehyde through a reaction zone containing an oxide of a metal selected from the group consisting of molybdenum and uranium at a temperature in the range from 225° to 500° C. for a contact time in the range from 1 to 50 seconds until a portion of the metal oxide has been reduced to a lower valence state, removing the methacrolein formed from the reaction zone and then passing an oxidizing gas through said reaction zone across the reduced metal oxide under conditions suitable for oxidizing the reduced metal oxide until the metal oxide has been substantially oxidized to a higher valence state.

5. A continuous process for preparing methacrolein comprising continuously passing vapor of isobutyraldehyde through a reaction zone containing an oxide of a metal selected from the group consisting of molybdenum and uranium at a temperature in the range from 225° to 500° C. for a contact time in the range from 1 to 50 seconds while continuously removing from the reaction zone portions of reduced oxide of said metal and continuously replacing the portions removed with an oxide of said metal having a higher valence state than that of the oxide removed.

References Cited
UNITED STATES PATENTS

| | | | |
|---|---|---|---|
| 1,636,952 | 7/1927 | Craver | 260—603 X |
| 2,101,820 | 12/1937 | Woodhouse | 260—601 X |
| 2,500,482 | 3/1950 | Barter | 260—683.3 |
| 2,964,577 | 12/1960 | Nace et al. | 260—683.3 |

LEON ZITVER, *Primary Examiner.*

CHARLES B. PARKER, *Examiner.*

J. J. SETELIK, B. HELFIN, *Assistant Examiners.*